United States Patent [19]

Schneider et al.

[11] Patent Number: 5,706,840
[45] Date of Patent: Jan. 13, 1998

[54] PRECISION CLEANING APPARATUS AND METHOD

[75] Inventors: Thomas W. Schneider, Albuquerque; Gregory C. Frye, Cedar Crest; Stephen J. Martin, Albuquerque, all of N. Mex.

[73] Assignee: Sandia Corporation, Albuquerque, N. Mex.

[21] Appl. No.: 398,276

[22] Filed: Mar. 3, 1995

[51] Int. Cl.⁶ .................................................. B08B 3/02
[52] U.S. Cl. ..................... 134/56 R; 134/58 R; 134/113; 134/104.2
[58] Field of Search ............................. 134/58 R, 104.2, 134/109, 113, 184, 201, 56 R; 73/60.1

[56] References Cited

U.S. PATENT DOCUMENTS

| | | | |
|---|---|---|---|
| 4,731,154 | 3/1988 | Hazlitt et al. | 134/113 |
| 4,796,042 | 1/1989 | Mappin et al. | 134/113 |
| 4,817,430 | 4/1989 | Benes | 73/579 |
| 4,872,356 | 10/1989 | Barnett et al. | 134/113 |
| 5,069,235 | 12/1991 | Vetter et al. | 134/113 |
| 5,102,504 | 4/1992 | Saito | 134/111 |
| 5,141,009 | 8/1992 | Morabtz | 134/113 |
| 5,201,215 | 4/1993 | Granstaff | 73/54.41 |
| 5,341,601 | 8/1994 | Dausch et al. | 68/12.02 |
| 5,369,033 | 11/1994 | Di Milia | 436/148 |
| 5,396,178 | 3/1995 | Rybarski | 134/113 |

OTHER PUBLICATIONS

T.W. Schneider and D.A. Buttry, "Electrochemical Quartz Crystal Microbalance Studies of Adsorption and Desorption of Self–Assembled Monolayers of Alkyl Thiols on Gold," *Journal of the American Chemical Society*, vol. 115, No. 26, pp. 12391–12397, (1993).

S.J. Martin, G.C. Frye, A.J. Ricco, and S.D. Sentura, "Effect of Surface Roughness on the Response of Thickness–Shear Mode Resonators in Liquids," *Analytical Chemistry*, vol. 65, pp. 2910–2922, Oct. 15, 1993.

J.D. Shoemaker, M. Meltzer, D. Miscovich, D. Montoya, P. Goodrich, and G. Blycker, *Cleaning Up Our Act: Alternatives for Hazardous Solvents Used in Cleaning*, Lawrence Livermore Laboratory Report No. UCRL–ID–115831, (available from National Technical Information Service, U.S. Department of Commerce, Springfield, VA) Jan. 1994.

V.E.Granstaff and S.J. Martin, "Characterization of a Thickness–Shear Mode Quartz Resonator with Multiple Nonpiezoelectric Layers," *Journal of Applied Physics*, vol. 75, pp. 1319–1329, Feb. 1, 1994.

P.T. Varineau and D.A. Buttry, "Applications of the Quartz Crystal Microbalance to Electrochemistry. Measurement of Ion and Solvent Populations in Thin Films of Poly(vinylferrocene) as Functions of Redox State," *Journal of Physical Chemistry*, vol. 91, No. 6, pp. 1292–1295 (1987).

S.J. Martin, V.E. Granstaff, and G.C. Frye, "Characterization of a Quartz Crystal Microbalance with Simultaneous Mass and Liquid Loading," *Analytical Chemistry*, vol. 63, pp. 2272–2281, Oct. 15, 1991.

U.S. application No. 08/108,935, Wessendorf, filed Aug. 18, 1993.

*Primary Examiner*—Frankie L. Stinson
*Attorney, Agent, or Firm*—John P. Hohimer

[57] ABSTRACT

A precision cleaning apparatus and method. The precision cleaning apparatus includes a cleaning monitor further comprising an acoustic wave cleaning sensor such as a quartz crystal microbalance (QCM), a flexural plate wave (FPW) sensor, a shear horizontal acoustic plate mode (SH—APM) sensor, or a shear horizontal surface acoustic wave (SH—SAW) sensor; and measurement means connectable to the sensor for measuring in-situ one or more electrical response characteristics that vary in response to removal of one or more contaminants from the sensor and a workpiece located adjacent to the sensor during cleaning. Methods are disclosed for precision cleaning of one or more contaminants from a surface of the workpiece by means of the cleaning monitor that determines a state of cleanliness and any residual contamination that may be present after cleaning; and also for determining an effectiveness of a cleaning medium for removing one or more contaminants from a workpiece.

35 Claims, 8 Drawing Sheets

PRECISION CLEANING APPARATUS AND METHOD

This invention was made with Government support under Contract. No. DE-AC04-94AL85000 awarded by the U.S. Department of Energy. The Government has certain rights in the invention.

FIELD OF THE INVENTION

The present invention relates to an apparatus and method for precision cleaning of a workpiece to remove contaminants therefrom and to measure the effectiveness of cleaning thereof, including any residual contamination thereon after cleaning. The precision cleaning apparatus includes a cleaning monitor further comprising an acoustic wave cleaning sensor such as a quartz crystal microbalance (QCM), a flexural plate wave (FPW) sensor, a shear horizontal acoustic plate mode (SH—APM) sensor, or a shear horizontal surface acoustic wave (SH—SAW) sensor; and measurement means connectable to the sensor for measuring at least one electrical response characteristic that varies in response to removal of a layer of one or more contaminants from the sensor during cleaning.

BACKGROUND OF THE INVENTION

In an age of environmental concern and increased regulation of hazardous substances, many types of chemicals used heretofore for cleaning processes are being reevaluated and replaced by less hazardous alternatives. These hazardous substances previously used for cleaning of workpieces include chlorofluorocarbons (CFCs), halogenated hydrocarbons (e.g. trichloroethylene and trichloroethane), hydrocarbons (e.g. toluene and Stoddard solvent), and oxygenated solvents (e.g. acetone and alcohols). Use of many of the above chemicals is becoming increasingly undesirable and costly due to the need for extensive record keeping, air permits, disposal of waste chemicals, risk of exposure of workers, and future liability for cleanup or damages.

As a result, there is a need to find alternatives to the hazardous chemicals presently used for many types of cleaning processes; and means are needed for evaluating the effectiveness of these new alternative chemicals under actual cleaning situations. For cleaning problems where no alternative chemicals are found suitable to replace the use of hazardous chemical cleaning media, there is the further need to minimize the amount of hazardous chemicals used, and to prolong the service life of these chemicals to limit the high cost for disposal of waste chemicals that may far exceed the initial cost of the chemicals.

There is a further need for a cleaning monitor for quantitatively measuring parameters of a cleaning process. Such a cleaning monitor as disclosed hereinafter according to the present invention may be used to measure in-situ an effectiveness of a cleaning medium for removing one or more contaminants from a workpiece; to determine when a workpiece is effectively cleaned; and to determine the initial and residual contamination levels on the workpiece. Such a cleaning monitor as disclosed hereinafter may further provide a basis for quantitatively comparing two or more cleaning media to determine which is the most effective for cleaning a workpiece having a particular contaminant thereon.

In the prior art, the effectiveness of particular cleaning media has been evaluated only after cleaning of a workpiece. Qualitative evaluation methods in the prior art include wiping the workpiece (for example, with a white glove), or performing a water break test (i.e. dipping the cleaned workpiece in water and looking for the formation of water spots or beads on the surface of the workpiece after removal from the water). Quantitative evaluation methods in the prior art for measuring the amount of contamination or residue on a surface after cleaning include ionography (i.e. conductivity measurements), optical scanning, x-ray fluorescence (XRF), Fourier transform infrared spectrometry (FTIR), gas chromatography mass spectrometry (GC/MS), ellipsometry, and electron spectroscopy chemical analysis (ESCA). These prior art evaluation methods are not readily amenable to in-situ measurements during cleaning of a workpiece.

An advantage of the apparatus and method of the present invention is that a layer of one or more contaminants on a cleaning sensor substantially equal to an accumulation of contaminants on a workpiece may be continuously measured in-situ during removal of the contaminant from the workpiece and sensor during cleaning.

Another advantage of the present invention is that a cleaning monitor may be provided for accumulating on at least one exposed side thereof a layer of at least one contaminant substantially equal to an accumulation on a workpiece.

Another advantage of the present invention is that a residual accumulation of at least one contaminant may be determined after cleaning the workpiece and sensor for a period of time.

A further advantage is that the apparatus and method of the present invention may include one or more quantitative or qualitative indicators for indicating a state of cleanliness of the workpiece.

Still another advantage of the present invention is that cleaning of the workpiece may be automatically terminated or the workpiece automatically removed from a cleaning zone after a predetermined state of cleanliness of the workpiece is attained.

Yet another advantage is that an effectiveness of a cleaning medium for removing one or more contaminants from a workpiece may be determined by practice of the present invention, or the cleaning effectiveness of a plurality of cleaning media may be compared quantitatively.

These and other advantages of the precision cleaning apparatus and method of the present invention will become evident to those skilled in the art.

SUMMARY OF THE INVENTION

Accordingly, it is a primary object of the present invention to provide a precision cleaning apparatus and method which overcomes the disadvantages and limitations of the prior art.

An additional object of the present invention is to provide an apparatus and method for precision cleaning of an accumulation of at least one contaminant from a surface of a workpiece.

A further object of the present invention is to provide an apparatus including a cleaning monitor for accumulation of a layer of at least one contaminant on one or more exposed sides of the cleaning monitor substantially equal to an accumulation on a surface of a workpiece for determining a state of cleanliness of the workpiece during cleaning thereof.

Still another object of the present invention is to provide a cleaning monitor for determining a residual accumulation of one or more contaminants after cleaning for a period of time.

An additional object of the present invention is to provide an apparatus and method for determining an effectiveness of a cleaning medium for removing at least one contaminant from a workpiece.

Additional objects, advantages, and novel features of the invention will become apparent to those skilled in the art upon examination of the following description, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as described herein, a precision cleaning apparatus and method are provided. The apparatus for precision cleaning of an accumulation of at least one contaminant from a surface of a workpiece using a cleaning medium comprises a cleaning container having walls which define a cleaning zone wherein the workpiece is contacted by the cleaning medium for removal of contaminants therefrom, and a cleaning monitor for measuring in-situ the removal of the contaminants by cleaning. The cleaning monitor further comprises a cleaning sensor insertable into the cleaning zone with at least one exposed side thereof for accumulating a layer of the contaminant thereon (prior to insertion of the sensor into the cleaning zone) substantially equal to the accumulation on the surface of the workpiece, and a measurement means connectable to the sensor for measuring at least one electrical response characteristic thereof that varies in response to removal of the layer of contaminant from the sensor during contact with the cleaning medium.

In another embodiment of the present invention, a cleaning monitor is provided comprising a cleaning sensor insertable into a cleaning zone with at least one exposed side thereof for accumulation of a layer of one or more contaminants thereon (prior to insertion of the sensor into the cleaning zone) substantially equal to an accumulation of contaminants on a surface of a workpiece, and a measurement means connectable to the sensor for measuring at least one electrical response characteristic of the sensor that varies in response to removal of the layer of contaminant from the sensor during contact with a cleaning medium in the cleaning zone.

Other objects, advantages and novel features of the invention will become apparent from the following detailed description thereof when considered in conjunction with the accompanying drawings.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
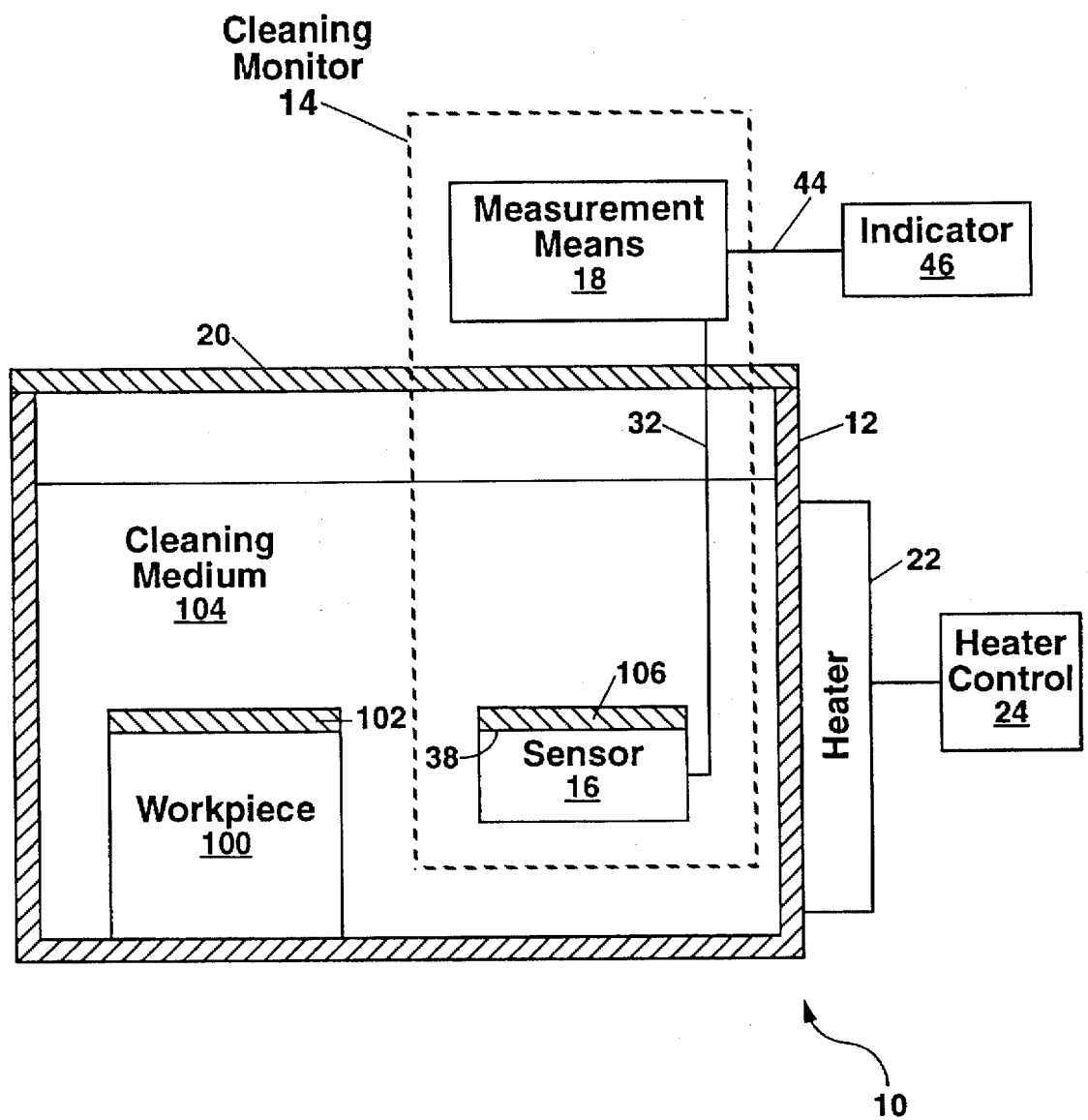
FIG. 1 shows a schematic diagram of an apparatus for precision cleaning according to the present invention.

Referring to FIG. 1, there is shown a schematic diagram of an apparatus for precision cleaning according to the present invention. The apparatus 10 comprises a cleaning container 12 having walls for defining a cleaning zone within the container. (The cleaning zone as defined herein may also include a recirculation stream of the cleaning medium.) A workpiece 100 having an accumulation 102 of at least one contaminant disposed on one or more surfaces thereof may be cleaned (i.e. the contaminant substantially or entirely removed) by placing the workpiece within the container 12 and contacting the workpiece with a cleaning medium 104 for a period of time. The apparatus 10 further includes a cleaning monitor 14 comprising a cleaning sensor 16 insertable into the cleaning zone with at least one side thereof being exposed for accumulating a layer 106 of the contaminant thereon prior to insertion of the sensor into the cleaning zone. The layer 106 is preferably substantially equal in composition and thickness to the accumulation 102 on the workpiece 100 so that removal of the layer 106 by contact with the cleaning medium 104 may provide a measure of removal of the accumulation 102 of contaminant from the workpiece 100. The cleaning monitor 14 further comprises a measurement means 18 connectable to the sensor 16 for measuring at least one electrical response characteristic of the sensor that varies in response to removal of the layer 106 of contaminant therefrom during cleaning.

The precision cleaning apparatus 10 of the present invention is applicable to many types of cleaning problems as known to the art of cleaning. These cleaning problems include, for example, removing a solder flux accumulation 102 from a printed circuit board workpiece 100; removing a copper oxide accumulation from a copper workpiece; removing an organic material accumulation such as grease or oil from a metal part workpiece, removing a tapping compound accumulation from a metal workpiece after a manufacturing operation for tapping screw threads therein; removing a grease-like graphite lapping compound accumulation from a workpiece; removing a layout dye or paint accumulation from a workpiece; or removing a photoresist accumulation from a semiconductor wafer after a semiconductor manufacturing process.

Most industrial operations for fabricating workpieces result in the accumulation of contaminants thereon that must be eventually removed. The accumulation 102 of contaminants to be removed from a workpiece 100 by cleaning may vary widely in chemical composition, and may include organic and inorganic materials, and combinations thereof. The accumulation of contaminants may further be a viscous liquid (for example, grease or oil). Alternately the accumulation 102 may be a solid or a visco-elastic material (for example, dirt or paint or photoresist) that is not permanently or rigidly attached to the workpiece, but removable upon contact with the cleaning medium 104 for a period of time.

The most common contaminants to be removed from a workpiece 100 in an industrial application of the present invention may include, for example, dirt, oil, and grease and combinations thereof. For example, an oil contaminant such as a machine oil may be applied to a workpiece as a coolant or a lubricant during machining operations; and the accumulation 102 must be removed from the finished workpiece, or before further manufacturing operations may be carried out. As another example, a solder flux may be applied to a printed circuit board workpiece for soldering electrical interconnections therein; and the accumulation of flux is generally removed from the circuit board after the soldering operation.

The cleaning medium 104 may be either a liquid or a vapor compound as known to the art of cleaning. A workpiece 100 may be cleaned by immersion into a liquid bath cleaning medium 104 or by contact with a jet spray cleaning medium, or by contact with a vapor cleaning medium (as, for example, in a vapor degreaser using a chlorofluorocarbon vapor cleaning medium). Furthermore, the cleaning medium 104 to be used in practicing the present invention may have an aqueous or an organic composition; or the medium may be formed from a plurality of aqueous and/or organic chemicals (i.e. a hybrid cleaning medium). An aqueous cleaning medium 104 may include builders (defined herein as alkaline compounds, usually comprised of hydroxides and inorganic salts), silicates, phosphates, borates, surfactants (i.e. detergents), or complexing agents, or a combination thereof. An aqueous cleaning medium 104 may be formed by mixing a cleaning agent (i.e. a concentrated cleaning medium) with water.

An organic cleaning medium 104 may be preferred for cleaning workpieces 100 that may be damaged by contact with water. An organic cleaning medium 104 may include one or more oxygenated compounds, halogenated compounds, and hydrocarbons. Some organic cleaning media are water soluble for dilution thereof, or for forming a hybrid cleaning medium in combination with one or more aqueous cleaning media.

A recent discussion of some preferred cleaning media and their effectiveness for cleaning particular contaminants from different types of workpieces may be found in a report by J. D. Shoemaker, M. Meltzer, D. Miscovich, D. Montoya, P. Goodrich, and G. Blycker entitled *"Cleaning Up Our Act: Alternatives for Hazardous Solvents Used in Cleaning"* available from the National Technical Information Service, U.S. Department of Commerce, Springfield, Va. (Report No. UCRL-ID- 115831, published January 1994).

In FIG. 1, the cleaning container 12 is preferably formed from a material such as stainless steel that is relatively impervious to chemical attack by the cleaning medium 104. The container 12 may include a closure 20 such as a lid or door for substantially sealing the container. Such a closure 20 may be preferred to limit the escape of a volatile or a vapor cleaning medium 104; or to allow the container to be evacuated or pressurized; or to allow the workpiece 100 to be cleaned by the use of a jet spray or a vapor a cleaning medium 104.

The cleaning container 12 may further provide for a recirculation of the cleaning medium (i.e. a recirculation stream) by a pump and a filter so that contaminants may be removed from the cleaning medium, or so that a jet spray may be generated. Furthermore, the container may include a heater 22 and a heater control 24 for elevating the temperature of the cleaning medium 104 to improve an effectiveness for cleaning the contaminant from the workpiece 100 and sensor 16. (If the cleaning medium is heated to an elevated temperature, the elevated temperature may range from about 30° C. to about 90° C. or higher; but in any case the elevated temperature should preferably be limited to about 10° C. lower than a flash point of a flammable cleaning medium.) Finally, the cleaning container 12 may include an ultrasonic agitator for agitating the cleaning medium to improve an effectiveness for cleaning.

Portions of the container 12 such as the heater 22, the pump, and/or the ultrasonic agitator may be controlled by a control unit such as a timer or a computer for establishing a cleaning cycle or sequence for removing the accumulation 102 of contaminants from the workpiece 100. One or more workpieces 100 may be supported in the container 12 by a carrier (such as a hook, basket, tray, or the like for holding one or more workpieces) so that one or more surfaces of the workpiece may be accessible to the cleaning medium 104 as required for a manufacturing or cleaning process. (Surfaces to be cleaned on a workpiece may include both exterior and interior surfaces. Furthermore, the surfaces may have a surface texture that may be smooth or rough, and that may include scratches or abrasions that may affect the cleaning process.) Movement of the carrier holding the workpieces may further be automated in response to signals from the control unit or the measurement means 18 for placing the workpieces into the container 12 for cleaning for a period of time as determined by the cleaning monitor 14, and/or for removing the workpieces after cleaning.

The cleaning monitor 14 comprises a cleaning sensor 16 and a measurement means 18. The cleaning sensor 16 may be a quartz crystal microbalance (QCM) sensor, a flexural plate wave (FPW) sensor, a shear horizontal acoustic plate mode (SH—APM) sensor, or a shear horizontal surface acoustic wave (SH—SAW) sensor, or any other type of sensor having at least one electrical response characteristic that varies in response to a change of mass or layer thickness of a contaminant placed on at least one exposed side of the sensor.

Figure 2:
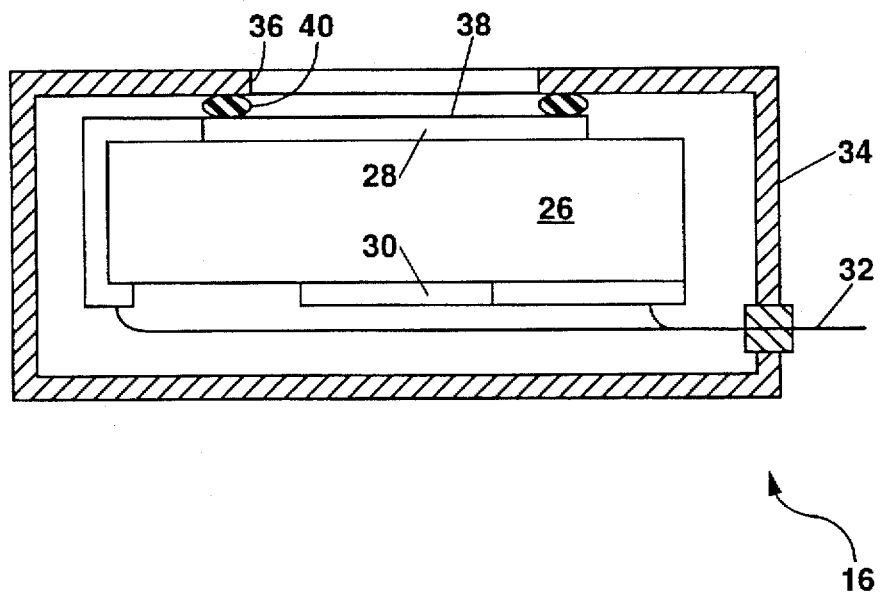
FIG. 2 shows a first example of a sensor for a cleaning monitor according to the present invention.

A preferred type of cleaning sensor 16 for practice of the present invention is a quartz crystal microbalance (QCM) sensor as shown schematically in FIG. 2. The QCM sensor 16 preferably comprises a thin plate of AT-cut quartz crystal 26 with an upper electrode 28 and a lower electrode 30 formed on opposite sides of the crystal plate. Because of the piezoelectric properties and crystalline orientation of the quartz plate, the application of a voltage between the electrodes results in a shear deformation of the crystal plate 26. The crystal can be electrically excited into resonance when the excitation frequency is such that the crystal thickness is an odd multiple of one-half of an acoustic wavelength in the quartz plate 26. At these resonant frequencies, a standing shear wave is generated across the thickness of the quartz plate for the fundamental and higher harmonic resonances. These resonant frequencies may also be altered or shifted by the presence of a contaminant layer 106 on one or more exposed sides 38 of the quartz crystal microbalance.

U.S. Pat. No. 5,201,215 to Granstaff et al discloses details of a quartz crystal microbalance, and is incorporated herein by reference. The Granstaff et al patent considers the case of a QCM loaded from above by a surface mass layer and a contacting fluid, with the mass layer being a solid such as a metal layer rigidly attached to the QCM. The present patent application, however, is the first known disclosure to teach that a viscous layer (i.e. the contaminant layer 106) in contact with a liquid (i.e. the cleaning medium 104) may be differentiated from the liquid, or measured during removal of the viscous layer from the cleaning sensor 16. The present patent application is also the first known disclosure to teach the use of a QCM sensor for use in a cleaning operation wherein a viscous or solid contaminant layer is removed from an exposed side of the sensor 16. The Granstaff et al patent is concerned solely with the application or deposition of a solid, rigidly attached mass layer (such as a metal, a metal alloy, a salt, a rigid polymer, or ice) to a surface of a QCM by an evaporation, electroplating, precipitation, or other chemical or thermodynamic reaction process.

As a first example of a cleaning sensor 16 that may be used for practice of the present invention, a QCM sensor is shown in FIG. 2. The QCM sensor 16 in this first example comprises a 2.54 centimeter diameter, synthetic AT-cut quartz wafer. Those skilled in the art will know that other sizes, shapes, and crystalline cuts of quartz, as well as lithium niobate, and certain cuts of lithium tantalate, or any piezoelectric material that allows shear deformations to be electrically excited may be used for forming the QCM sensor 16 in the examples of FIGS. 2 and 6.

The quartz crystal 26 in this first example may be about 0.33 millimeters thick, with side surfaces that are preferably lapped and polished. Upper and lower electrodes (28 and 30, respectively) may be formed and patterned on the upper and lower sides of the quartz crystal 26 by any number of means including vacuum-evaporating an adhesion layer (for example, about 1 to 20 nanometers or more of chromium, or titanium, or an organic glue such as 3-mercaptopropyl trimethoxysilane), followed by a thin layer (for example, about 100 to 200 nanometers) of gold or any other conductive metal.

In the first example of a cleaning sensor 16 in FIG. 2, the lower electrode 30 may comprise a central electrode region about 6.6 millimeters in diameter centered about the lower side of the quartz crystal 26. The central electrode region may be connected to a strip line electrical conductor for connection to a first wire in an electrical cable 32 such as a coaxial cable. In this example, the upper electrode 28 may have a circular portion of about 12.9 millimeters in diameter centered about the upper side of the quartz crystal 26 opposite the central electrode region. The upper electrode may be connected to another strip line conductor that wraps around the edge of the quartz crystal for connection to a second wire in the electrical cable 32. The upper electrode 28 preferably serves as a ground electrode; and the lower electrode 30 preferably serves as a radio-frequency (rf) electrode for the application of an electric potential to generate an oscillating electric field across the thickness of the quartz crystal 26. Because the electric field is largely confined to the quartz region adjacent to the smaller of the two electrodes, the QCM active area is substantially equal to the area of the smaller electrode, and for this first example is about 0.34 cm$^2$.

The first example of a cleaning sensor 16 in FIG. 2 is enclosed within a housing 34 having an opening 36 (for example, a circular opening) therein for exposure of the upper side of the QCM (i.e. at least a central part of the circular portion of the upper electrode 28) for accumulation of a contaminant layer 106 thereon, and for sensing the removal of the layer 106 during a cleaning process. The contaminant layer 106 may cover other portions of the sensor 16; but only that part of the contaminant layer in contact with the exposed side of the QCM adjacent to the active area thereof will be measurable by the sensor.

The contaminant layer 106 is preferably thin compared to the acoustic wavelength of the QCM sensor 16; and the exposed side of the QCM is preferably smooth for an ideal shear plane interaction with the contaminant layer and the cleaning medium. Any roughness of the exposed side may lead to increased mass loading and increased dissipation, thereby increasing a motional resistance and reactance of the loaded sensor.

Contacting the contaminant layer 106 and the cleaning medium 104 with the larger electrode (i.e. the exposed sides of the upper electrode 28) and keeping the larger electrode at ground potential prevents fringing rf electrical fields from entering the contaminant layer or cleaning medium and possibly causing electrochemical processes or acoustoelectric interactions therein. The exposed side 38 of the QCM may also be modified by the addition of an overlayer above the electrode to simulate or mimic a surface of the workpiece 100 to be cleaned. For example, if a copper workpiece such as a printed circuit board were to be cleaned, it may be desirable to vapor deposit a thin layer (about 10 nanometers) of copper on the exposed side 38 of the QCM to more accurately mimic the copper workpiece and any interactions that may occur between the copper surface of the workpiece and the contaminant and/or the cleaning medium. As another example, a thin layer of chromium (about 10 nanometers) may be vapor deposited on the exposed side 38 of the QCM for mimicking cleaning of a stainless steel workpiece 100 and more accurately sensing cleaning thereof.

The opening 36 may be centered about the circular portion of the upper electrode 28 as shown in the first example of FIG. 2, with the interior of the housing 34 preferably being sealed by a resilient seal 40 such as an o-ring, compressible washer, or a resilient adhesive between the housing and the exposed side 38 of the QCM to prevent any penetration of a liquid or vapor (such as the cleaning medium 104). An additional resilient member may be positioned below the QCM for mounting thereof within the housing 34.

The housing 34 is preferably formed of a material (for example, stainless steel or teflon) that is substantially impervious to the contaminant and/or the cleaning medium. The electrical cable 32 may penetrate the housing 34 by means of a second seal, a connector, a tube, or the like. In other embodiments of the present invention having two exposed sides 38 for the cleaning sensor 16, the housing 34 may have two openings 36 therein; or the housing may be entirely omitted. Alternatively, the housing 34 may be a flow-through housing or a housing mountable in contact with a recirculation stream of the cleaning medium 104 produced by a pump of the container 12.

For operation, the QCM sensor 16 is preferably connected to an oscillator circuit 42 for generating an oscillating electric field across the thickness of the quartz crystal 26. The oscillator circuit 42, which may be part of a measurement means 18 for measuring at least one electrical response characteristic of the cleaning sensor that varies in response to cleaning of the layer 106 of contaminants from the exposed side of the sensor, may be packaged separately from the cleaning sensor 16 and connected thereto by the electrical cable 32. Alternately, the oscillator circuit 42 may be located within the housing 34 near the sensor as shown in a second example of a cleaning sensor 16 in FIG. 6.

The oscillation frequency of the QCM sensor 16 is preferably at or near a fundamental resonance frequency of the crystal (as determined by the thickness of the crystal) so that shear deformation of the crystal occurs, and a standing wave is maintained. For the 0.33-millimeter-thick quartz crystal in the example of FIG. 2, the fundamental oscillation frequency is about 5 MHz when no contaminant layer or cleaning medium is present; and the frequency of oscillation decreases slightly due to liquid and mass loading of the QCM sensor 16 by the contaminant layer 106 and the cleaning medium 104.

Coupling between a mechanical displacement and the electrical potential in the piezoelectric quartz crystal causes mechanical interactions between the QCM and contacting media that influence the electrical characteristics of the QCM, particularly near resonance where the amplitude of the mechanical displacement oscillation of the quartz crystal is greatest. The QCM electrical characteristics may be evaluated using the electrical admittance (defined herein as the ratio of current flow to applied voltage, and may be considered to be the reciprocal of impedance). The electrical admittance contains information about the energy stored and the power dissipated in both the QCM and the perturbing media (i.e. the contaminant layer and the cleaning medium). The admittance of the QCM may be obtained by solving a boundary-value problem that includes a viscous or solid mass layer (i.e. the contamination layer) and a contacting fluid (i.e. the cleaning medium).

Figure 3:
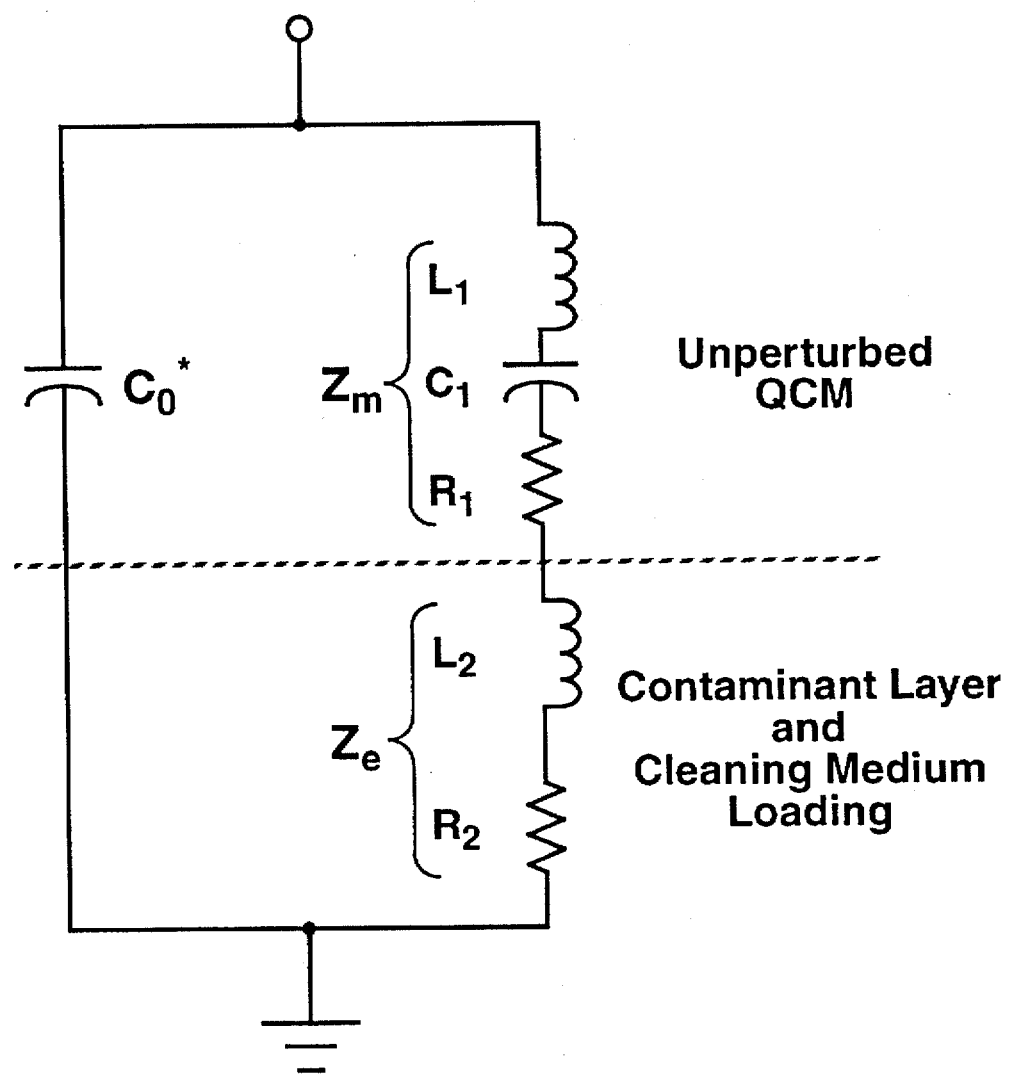
FIG. 3 shows a schematic representation of an equivalent circuit model for a quartz crystal microbalance sensor with an impedance element, $Z_e$, due to liquid and mass loading of at least one exposed side thereof.

FIG. 3 shows an equivalent circuit model that describes the electrical admittance for the QCM sensor 16 simultaneously loaded by the viscous or solid mass layer (i.e. the contaminant layer) and the contacting fluid (i.e. the cleaning medium). The total admittance, Y, can be found from an inspection of the equivalent circuit model and is given by:

$$Y = j\omega_s C_0^* + \left( \frac{1}{Z_m + Z_e} \right)$$

where $C_0^*$ and $Z_m$ represent a total capacitance and a motional impedance of the unperturbed part of the equivalent circuit above the dashed horizontal line in FIG. 3, and $Z_e$ represents a motional impedance element due to loading of the QCM sensor by the contaminant layer 106 and the cleaning medium 104. The above equation for the total admittance and the discussion hereinafter assumes that the contaminant layer 106 and the cleaning medium 104 are contacting only a single side of the QCM sensor 16. For a two-sided contact (i.e. two exposed sides 38 of the QCM sensor 16), certain resistive and motional inductance factors must be doubled; and a conduction current between the upper and lower electrodes (i.e. through the cleaning medium and/or the contaminant layer) must be considered.

The impedance elements in the equivalent circuit model in FIG. 3 can be related to the properties of the QCM sensor 16, the viscous or solid mass layer (i.e. the contaminant layer 106), and the contacting fluid (i.e. the cleaning medium 104). The current flow out of the lower electrode and into the upper electrode is known. Thus the admittance of the QCM sensor can be described in terms of its physical properties, the viscous or solid contaminant layer 106, and the contacting cleaning medium 104.

The method of the invention described herein involves characterizing the unperturbed QCM sensor 16 (i.e. calibrating the unperturbed cleaning sensor in the absence of any loading); characterizing the QCM sensor after loading with the contaminant layer 106 (to mimic or approximate the accumulation 102 of contaminant on the workpiece 100) and the cleaning medium 104; and periodically or continuously characterizing the QCM sensor during and/or after cleaning for a period of time to measure the removal of the contaminant and/or to measure any unremoved residual accumulation of the contaminant after cleaning.

In FIG. 3, the portion of the equivalent circuit above the dashed line is related to the unperturbed response of the QCM. In this unperturbed part of the equivalent circuit, a total capacitance, $C_0^*$, is equal to the sum of a static capacitance, $C_0$, due to the upper and lower electrodes (28 and 30, respectively) on the quartz crystal 26, and a parasitic capacitance, $C_p$, due to the geometry of the packaged QCM, including the strip lines and other electrical connections to the QCM. The static capacitance, $C_0$, arises from internal electric fields across the quartz, which also excite the mechanical (i.e. motional) response of the QCM; but the parasitic capacitance, $C_p$, arises from electric fields external to the QCM. By measuring the admittance characteristics of the QCM sensor at resonance and over a broad frequency range, the value of $C_0^*$ may be experimentally determined. In the unperturbed QCM sensor, a motional arm of the equivalent circuit model above the dashed line in FIG. 3 consists of an inductance, $L_1$, a capacitance, $C_1$, and a resistance, $R_1$ resulting in a motional impedance, $Z_m$.

The portion of the equivalent circuit model of the QCM sensor 16 below the dashed line in FIG. 3 consists of a complex impedance element, $Z_e$, that describes the electrical response of the QCM when one or more exposed sides 38 of the QCM sensor are loaded by the contaminant layer 106 and/or the cleaning medium 104. Such loading causes an increase in both a motional reactance, $\omega_s L_2$, and a motional resistance, $R_2$, contributing to $Z_e$.

Figure 6:
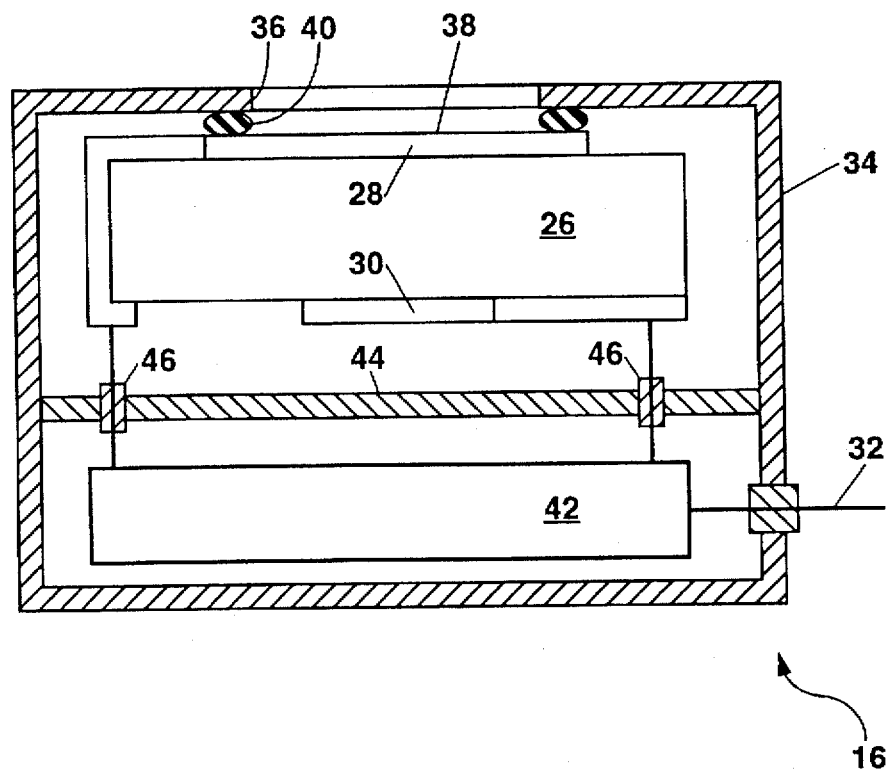
FIG. 6 shows a second example of a sensor for a cleaning monitor according to the present invention.

As an example, consider the effect of a viscous oil film contaminant layer 106 on the exposed side 38 of the QCM sensor 16 of FIGS. 2 or 6 in contact with a liquid cleaning medium 104. The complex impedance element, $Z_e$, is proportional to a mechanical (i.e. motional) impedance, $Z_s$, contributed by the oil film and liquid cleaning medium on the exposed side 38 given by:

$$Z_e = \frac{N\pi}{4K^2 \omega_s C_0} \left( \frac{Z_s}{Z_q} \right)$$

where N is a resonance harmonic number (i.e. 1, 3, 5, ... ), $K^2$ is an electromechanical coupling factor, $\omega_s = 2\pi f_s$ where $f_s$ is a series resonant frequency of the quartz crystal, $C_o$ is the static capacitance, and $Z_q$ is given by:

$$Z_q = (\rho_q \mu_q)^{1/2}$$

where $\rho_q$ is the density of quartz, and $\mu_q$ is the shear stiffness of quartz.

The mechanical impedance, $Z_s$, of the oil film contaminant layer 106 and the liquid cleaning medium 104 (approximated herein as a semi-infinite liquid that has a thickness large compared to a decay length of a radiated shear wave in the medium) in contact with the exposed side 38 of the QCM sensor 16 is given by:

$$Z_s = Z_0 \left[ \frac{Z_L \cosh(\beta h) + Z_0 \sinh(\beta h)}{Z_0 \cosh(\beta h) + Z_L \sinh(\beta h)} \right]$$

where $Z_0$ is a characteristic impedance of the oil film contaminant layer 106 given by:

$$Z_0 = (\rho_1 G)^{1/2}$$

with $\rho_f$ and G being the density and shear modulus of the oil film, respectively. In the above equation for the mechanical impedance, $Z_s$, the effect of the liquid cleaning medium 104 on the QCM sensor 16 is to provide an impedance contribution, $Z_L$, given by:

$$Z_L = \left( \frac{\omega_s \rho_L \eta}{2} \right)^{1/2} (1+j)$$

with $\rho_L$ and $\eta$ being the density and viscosity of the liquid cleaning medium, respectively, and $j=\sqrt{-1}$. In the above equation for $Z_s$, h is a thickness of the oil film contaminant layer 106 and $\beta$ is a shear wave propagation constant in the oil film given by:

$$\beta = j\omega_s \left( \frac{\rho_f}{G} \right)^{\frac{1}{2}}.$$

In the above analysis, the complex impedance element, $Z_e$, can be decomposed into a real and an imaginary component, represented by a motional resistance, $R_2$, and a motional reactance $\omega_s L_2$, respectively.

The motional resistance, $R_2$, which causes a resonance damping due to the presence of the oil film contaminant layer 106 and the liquid cleaning medium 104, can be described by the real part of $Z_s$ as:

$$R_2 = \frac{N\pi}{4 K^2 \omega_s C_0} \frac{Re(Z_s)}{Z_q}.$$

Figure 4A:
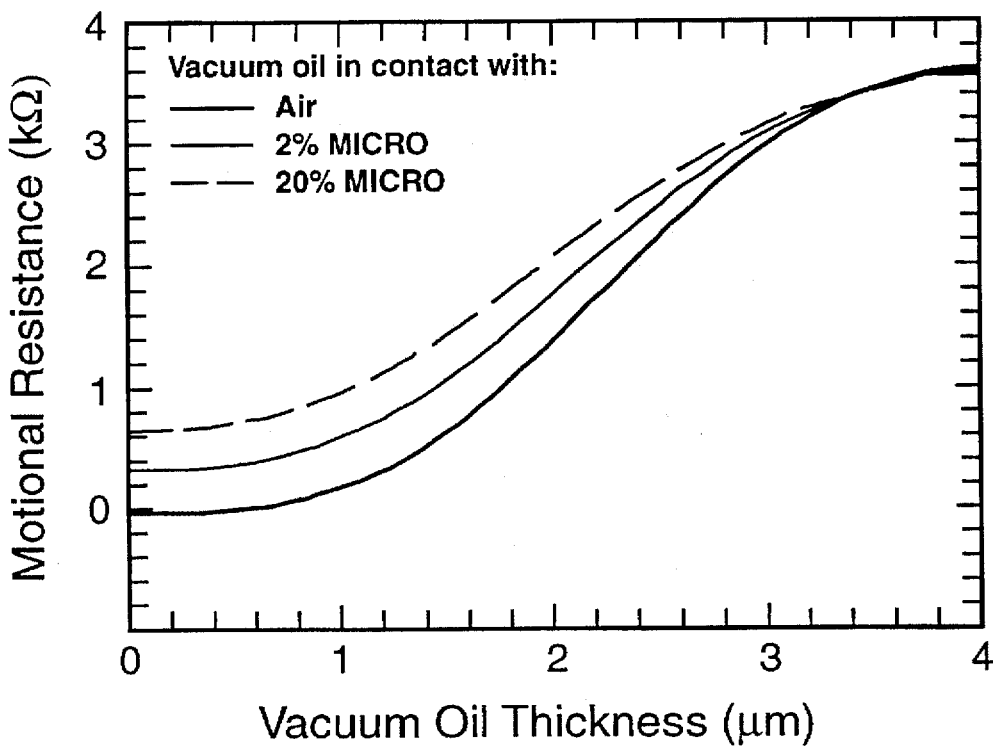
FIGS. 4a and 4b show the motional resistance and frequency shift, respectively, for a QCM sensor loaded by an oil film contamination layer on one exposed surface thereof and a cleaning medium at room temperature.

FIG. 4a shows the calculated motional resistance, $R_2$, of the QCM sensor 16 near room temperature for a varying thickness of the oil film contaminant layer 106 (as represented, for example, by a vacuum pump oil such as DUO SEAL vacuum pump oil manufactured by the Sargent Welch Scientific Company applied on the exposed side of the cleaning sensor by an atomizing air brush with a nitrogen gas propellant) and for different types of cleaning media 104 such as an aqueous solution of 2% by volume MICRO liquid laboratory cleaner (manufactured by International Products Corporation, Trenton, N.J.) in water; and a 20% aqueous solution of the same cleaning medium. For comparison, a calculated curve for the motional resistance, $R_2$, is also shown in FIG. 4a for the QCM sensor 16 in contact with air (representing either the absence of a liquid cleaning medium 104, or otherwise approximating the presence of a vapor cleaning medium 104). From FIG. 4a, it is seen that the motional resistance, $R_2$, depends relatively strongly on the thickness of the oil film contaminant layer 106, and to a lesser extent on the viscosity of the cleaning medium 104. At larger oil film thicknesses, $R_2$ values converge for the different cleaning media due to a reduction in the acoustic signal penetrating through the thickness of the oil film layer to interact with the cleaning media.

A shift, $\Delta f$, in the resonance frequency, $f_s$, due to loading by the oil film contaminant layer 106 and the liquid cleaning medium 104 is related to the imaginary part of $Z_s$ as:

$$\Delta f = -\frac{f_s}{N\pi} \frac{Im(Z_s)}{Z_q} = -\frac{f_s L_2}{2 L_1}.$$

Figure 4B:
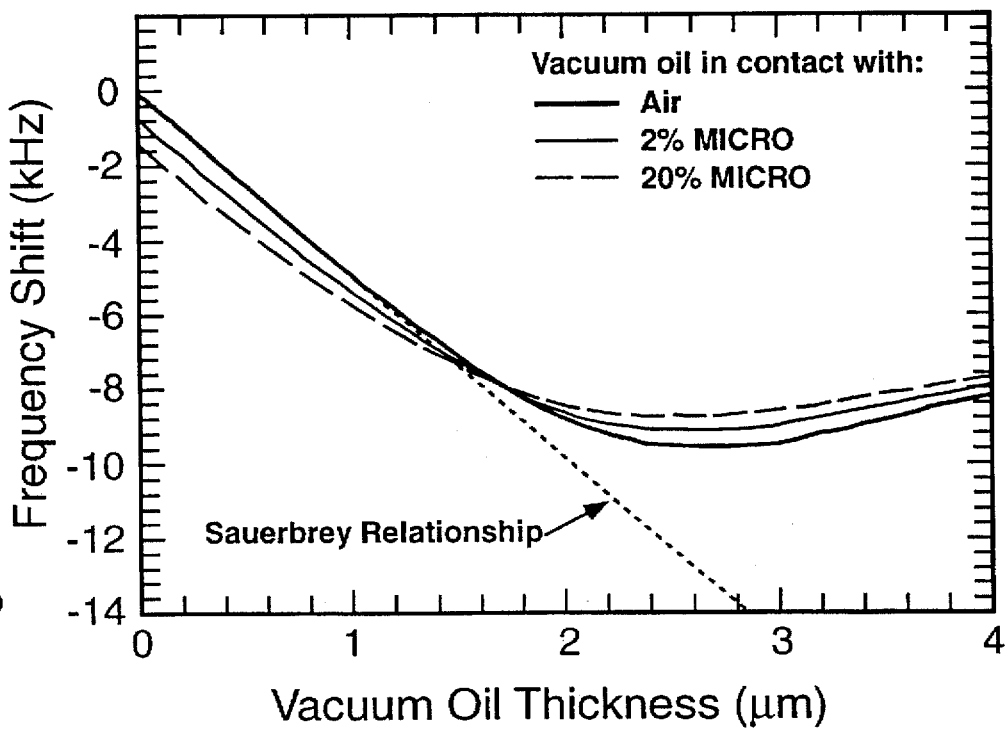

FIG. 4b shows this frequency shift corresponding to FIG. 4a together with an idealized frequency shift as represented by a Sauerbrey relationship. In FIG. 4b, the frequency shift, $\Delta f$, is substantially linear when the thickness of the oil film contamination layer 106 is less than about 2 microns. In FIG. 4b, the negative offset in the frequency shift in the two cleaning media as compared to air is due to the greater viscosity of the liquid cleaning media. In the practice of the present invention for cleaning, this negative offset can either be disregarded or calibrated for, since only the relative change in frequency during cleaning might be measured. Alternately, the QCM sensor may be removed from the cleaning medium and air dried to obtain a more accurate measurement of any residual accumulation of contaminant on the cleaning sensor for small layer thicknesses.

For large film thicknesses (about 3 microns or greater) in FIGS. 4a and 4b, the motional resistance and frequency shift response curves level off due to a substantially complete damping of the acoustic signal within the thickness of the oil film layer. In practice of the present invention, these response characteristics (such as the resistance or a damping voltage proportional thereto, and the frequency shift) would remain substantially constant at levels indicating a "dirty" state until the oil film contamination layer is removed sufficiently for the electrical response characteristics of the QCM sensor 16 to begin to change, at which point the removal of the remaining contaminant layer may be monitored in-situ, proceeding toward a state of cleanliness of the sensor and the workpiece. (A state of cleanliness as defined herein is a measure of an amount or thickness of contamination on the cleaning sensor 16 and may be indicated either qualitatively as, for example, a "dirty" state or a "clean" state; or quantitatively as, for example, a thickness or mass per unit area, $\Delta m$, of a contaminant layer 106 on the sensor as calculated from a measure of one or more electrical response characteristics of the sensor.) Thus, from FIG. 4, the cleaning monitor is shown to be especially sensitive for precision cleaning whereby the oil film contamination layer is removed to a thickness of about 2 microns or less. Furthermore, the sensitive response of the QCM sensor to a very small thickness of the contaminant layer 106 (and in particular the linear response of the frequency shift as shown in FIG. 4b) is advantageous for measuring any residual accumulation of the contaminant after cleaning for a period of time.

Figure 5A:
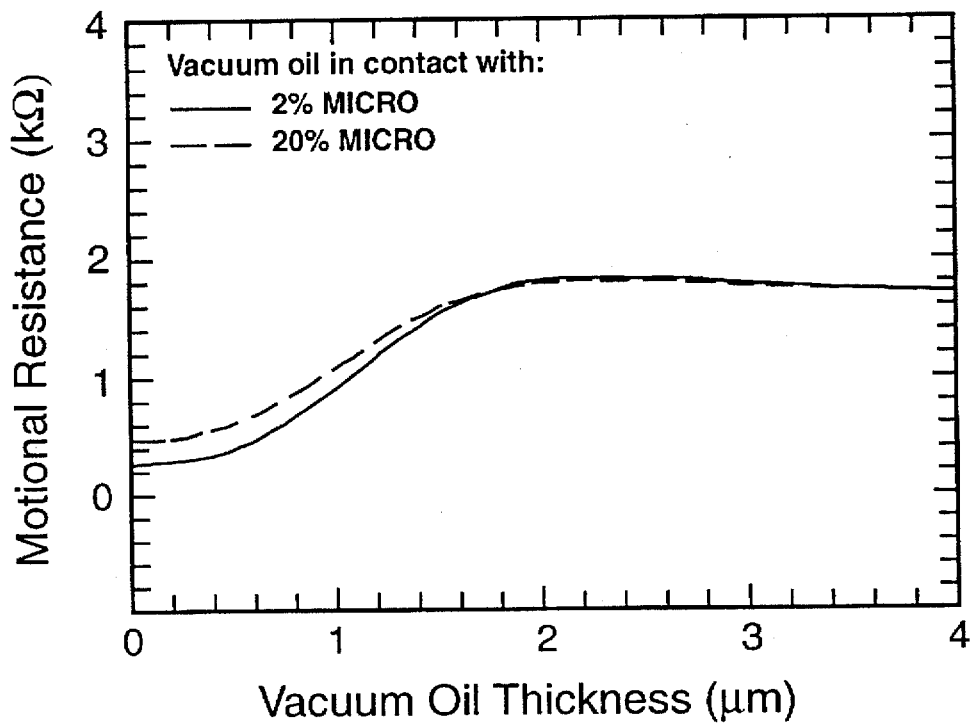
FIGS. 5a and 5b show the motional resistance and frequency shift, respectively, for the QCM sensor of FIG. 4 in contact with a cleaning medium at an elevated temperature of 50° C.
Figure 5B:
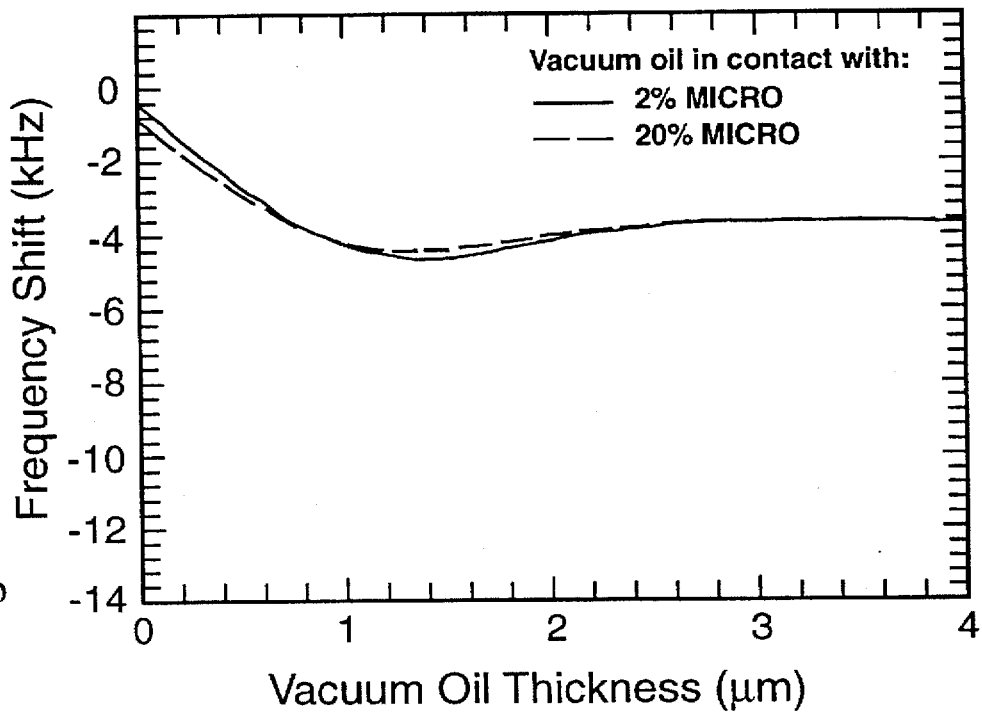

FIGS. 5a and 5b show the dependence of the motional resistance, $R_2$, and the frequency shift, $\Delta f$, on the oil film contamination layer 106 in contact with the cleaning media of FIG. 4 when the cleaning media is heated to an elevated temperature of about 50° C. At 50° C., the oil film and the cleaning media have reduced viscosities, thereby reducing the changes in the motional resistance and frequency shift with the thickness of the oil film layer 106. The largest change in the motional resistance and the frequency shift, however, still occurs when the thickness of the oil film contamination layer is small, making these electrical response characteristics particularly useful for monitoring a final stage of removal of the contamination layer (i.e. for precision cleaning which is defined herein as being the removal by cleaning of the last few microns of a contaminant layer or accumulation), and for determining any unremoved residual accumulation of the contaminant after cleaning.

From FIGS. 4 and 5 either the motional resistance, $R_2$, (or a damping voltage proportional to $R_2$) or the shift, $\Delta f$, in the resonance frequency or both may be measured during removal of the contaminant layer 106 by contact with a cleaning medium 104 to provide a measure of a state of cleanliness of the workpiece 100 that is placed in the cleaning container 12 proximate to the QCM cleaning monitor 16. Values for $\Delta f$, or $R_2$ or both may be measured by connecting the QCM sensor 16 to the measurement means 18 as shown in FIG. 1.

The measurement means 18 may comprise an oscillator circuit 42 for activating the QCM sensor 16 and for providing a damping voltage proportional to $R_2$ or a resonance oscillation frequency, $f_s$, or both. The oscillator circuit 42 is preferably designed to allow operation of the QCM sensor 16 in the presence of a large damping due to liquid and mass loading by the contaminant layer 106 and the cleaning medium 104. This damping may result in a large change in the motional resistance, $R_2$, as shown in FIGS. 4a and 5a due to the accumulation and removal of the contaminant layer from the cleaning sensor 16.

An oscillator circuit 42 that may be used to allow operation of the QCM sensor 16 in the presence of a large damping is disclosed in an U.S. Pat. No. 5,416,448 to Wessendorf; which is incorporated herein by reference. This lever oscillator circuit as disclosed by Wessendorf uses negative feedback in a differential amplifier configuration to actively and variably divide (i.e. leverage) the QCM impedance such that the oscillator circuit 42 can maintain the phase and gain of the feedback loop over a wide range of the motional resistance, $R_2$. The lever oscillator circuit 42 of Wessendorf is also advantageous in that it allows one side of the QCM sensor 16 (for example, the exposed side 38 in contact with the cleaning medium 104) to be grounded. Another advantage of the above lever oscillator circuit 42 that we have determined from practice of the present invention is that the QCM sensor 16 may be operated in air (allowing a calibration of the cleaning sensor prior to insertion into the cleaning medium or after air drying; or allowing the use of the sensor for vapor cleaning applications), or in fluids having viscosities up to about 200 cP. The lever oscillator circuit 42 as used herein operates at a low power supply voltage (about 5 volts), and provides electric response characteristic signal outputs corresponding to the resonance oscillation frequency, $f_s$, of the QCM sensor and a magnitude of the damped resonance of the QCM sensor (i.e. the damping voltage proportional to $R_2$).

Other types of oscillator circuits as known to the art of acoustic wave sensors may also be used for activation of a QCM sensor 16 or other types of cleaning sensors 16 according to the present invention. Alternately, the measurement means 18 may comprise a network analyzer connected to the QCM sensor or other types of cleaning sensors 16 for providing a direct measure of $R_2$, or any other electric response characteristic that varies in response to cleaning of the layer of contaminants from one or more exposed sides of the sensors.

The measurement means 18 may further include one or more electrical measuring instruments such as a frequency counter, a voltmeter, a comparator circuit, a signal digitizer, a computer, or the like for measuring, digitizing, or recording at least one electrical response characteristic of the cleaning sensor 16 that varies in response to cleaning of the layer of contaminants from the exposed side of the sensor. The measurement means 18 may also include a temperature sensor and readout for measuring the temperature of the cleaning medium to compensate for a variation in the electrical response characteristics of the sensor 16 with temperature.

One or more electrical output signals 44 may be provided by the measurement means 18. These electrical output signals 44 are preferably used to drive one or more indicators 46; and the electrical output signals may be further directed to a control unit of the container 12 for activating and/or deactivating a heater, a pump, an ultrasonic agitator, or a combination thereof, or for automatically terminating cleaning (for example, by removing the workpiece 100 from the cleaning zone) after a state of cleanliness has been attained as determined by the cleaning monitor 14.

Each indicator 46 may provide a quantitative measure of one or more electrical response characteristics of the cleaning sensor 16, or a qualitative measure derived from the sensor response, or both. A quantitative indicator 46, for example, may be a readout, recording, or printout of one or more electrical response characteristics of the sensor 16 such as the resonance frequency, $f_s$, the shift in the resonance frequency, $\Delta f$, the damping voltage proportional to $R_2$, the resistance value of $R_2$, or the thickness, h, of the contaminant layer 106 as calculated from a calibration of the cleaning sensor 16 and the measured electrical response characteristics of the QCM sensor using the equivalent circuit model of FIG. 3.

A qualitative indicator 46 may be, for example, a visual or an audible signal for indicating that a state of cleanliness of the workpiece 100 has been reached, or that the cleaning process is substantially complete (i.e. that substantially all of the contaminant layer 106 has been removed from the exposed side of the cleaning sensor 16 by contact with the cleaning medium 104). A comparator circuit in the measurement means 18, for example, may compare the damping voltage with one or more stored or internally generated calibration voltages to provide outputs to different colored indicator lights 46 for indicating "dirty" and "clean" states of cleanliness of the sensor 16 (and hence of the workpiece 100 also in contact with the cleaning medium). For example, a red indicator light 46 may indicate a "dirty" state for a cleaning sensor and workpiece immediately after insertion into the cleaning medium. And, after a predetermined state of cleanliness as determined by the cleanliness monitor 14 has been reached, the red indicator light may be switched off, and a green indicator light may be switched on to indicate that a "clean" state has been attained for the cleaning sensor and workpiece. An additional colored indicator light 46 (for example, a blue light) may indicate a "dry" state of the cleaning sensor 16 before insertion into the cleaning medium 104, or after removal therefrom and air drying. A further indicator light 46 (for example, a white light) may indicate a "calibration" state of the sensor, for example, when the contaminant layer is completely removed and the sensor dried and restored to its original state prior to the accumulation of the contaminant layer thereon, and ready for reuse. Such qualitative indicators 46 may reduce the cost and complexity of the apparatus for precision cleaning 10 for a particular type of workpiece 100, and prove particularly useful for many industrial cleaning applications.

FIG. 6 shows a second example of a QCM sensor 16 according to the present invention. In FIG. 6, the housing 34 has been enlarged for location of the oscillator circuit 42 within the cleaning sensor 16 and adjacent to the quartz crystal 26. Such a close proximity of the crystal and oscillator circuit may be advantageous for reducing a parasitic capacitance for the QCM sensor 16 in order to maintain a total electrical impedance of the QCM connected to the oscillator circuit 42 at a constant phase near zero. In the second example of FIG. 6, the oscillator circuit 42 is preferably separated from the quartz crystal 26 by a liquid-tight or a vapor-tight barrier 44 having feedthroughs 46 for connecting the quartz crystal to the oscillator circuit. (Additionally, a resilient conduction means such as a conductive rubber or a metal spring may be located between each feedthrough 46 and the quartz crystal for cushioning of the QCM and contacting thereof.) In this second example of a QCM sensor 16 as shown in FIG. 6, the electrical cable 32 may supply electrical power to the oscillator circuit, and connect one or more inputs and/or outputs of the circuit to the measurement means 18.

Figure 7A:
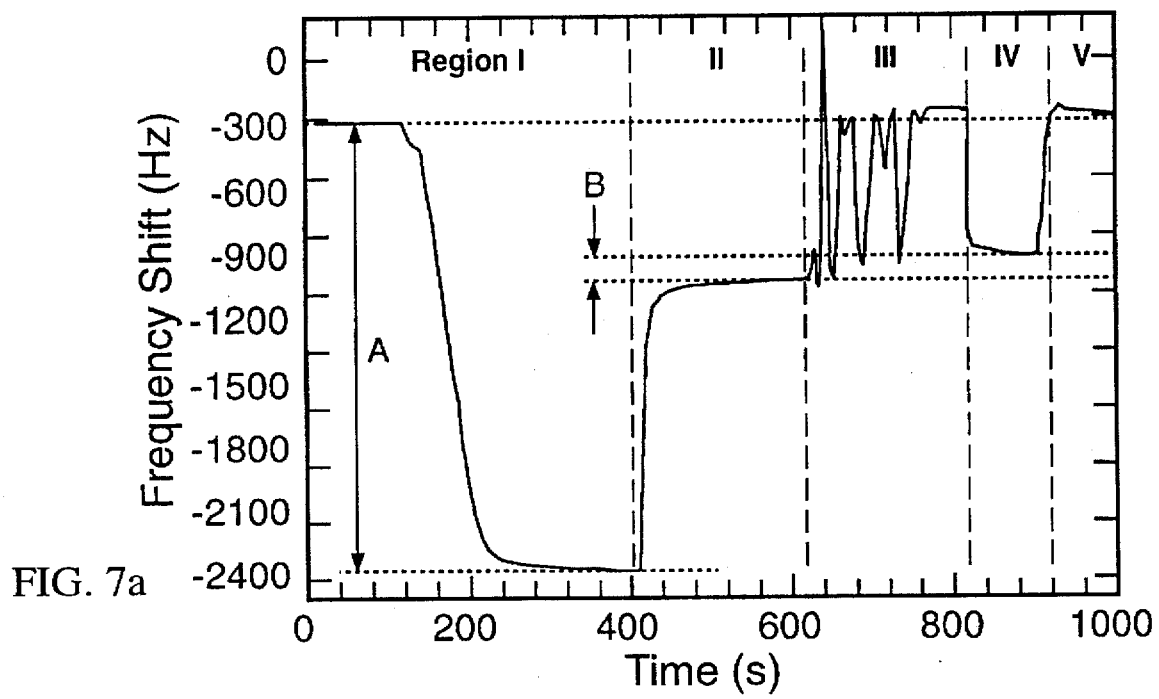
FIGS. 7a and 7b show temporal recordings of the frequency shift and a damping voltage, respectively, for the QCM cleaning monitor during a room-temperature cleaning process according to the present invention.
Figure 7B:
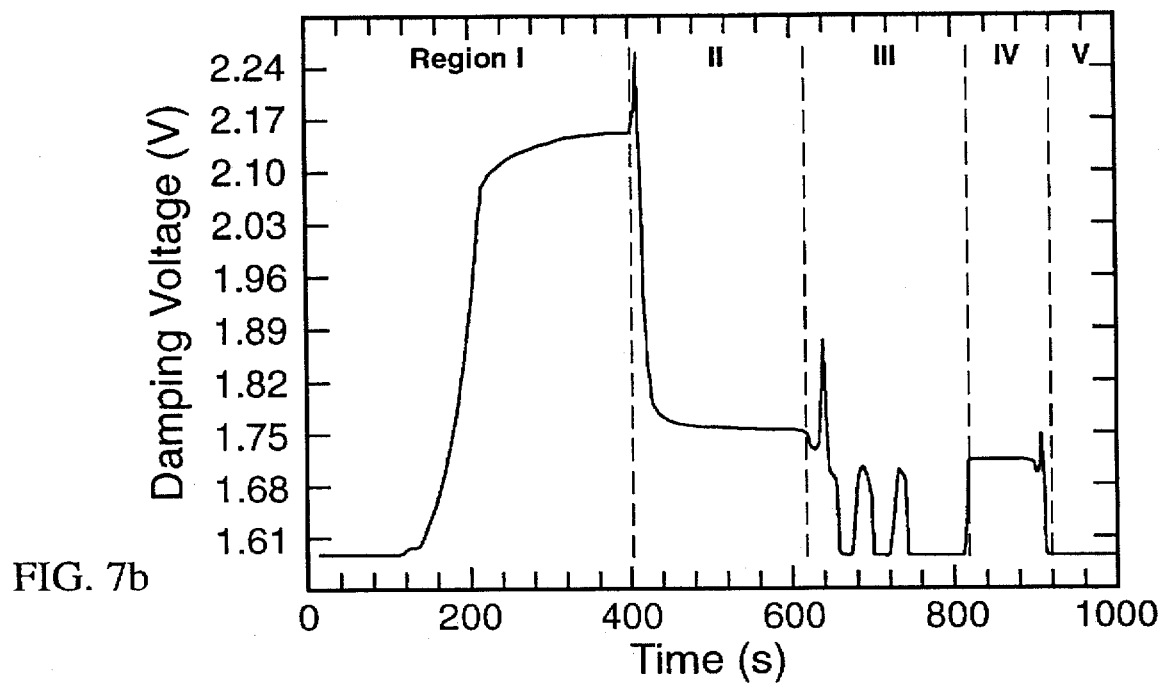
Figure 8:
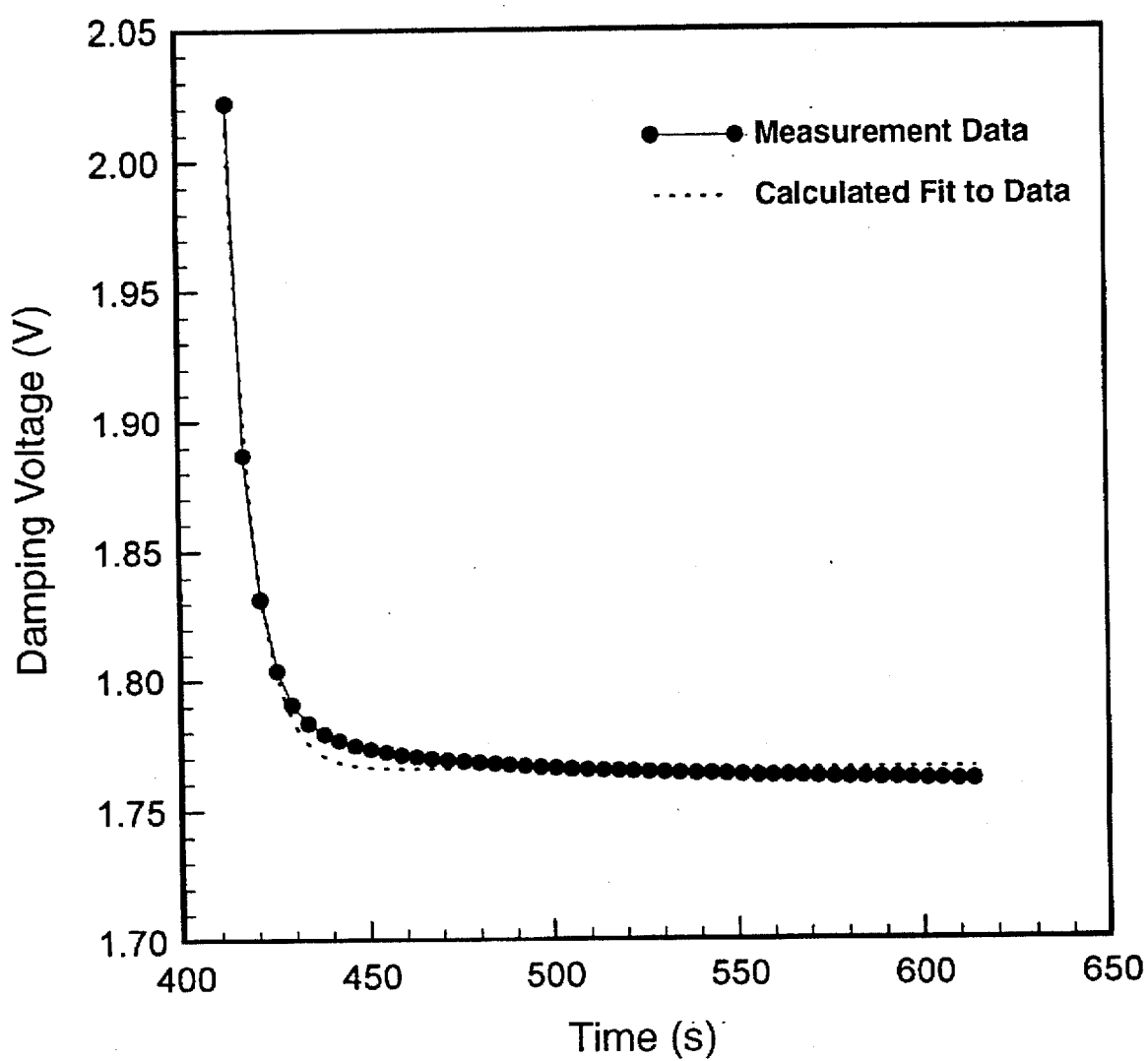
FIG. 8 shows a portion of the recording of FIG. 7b during which a vacuum oil contaminant layer is removed by a liquid cleaning medium, and an exponential fit thereto for determining a time constant for the cleaning process.

FIGS. 7 and 8 show experimental data from the cleaning monitor 14 of the present invention during use of the precision cleaning apparatus 10 with a liquid cleaning medium at room temperature (about 23° C.). For this experiment, a vacuum pump oil contaminant layer 106 having a room-temperature viscosity of about 30 Cp is applied to the exposed surface 38 of the QCM sensor 16 by an atomizing air brush as described heretofore. (In an industrial use of the precision cleaning apparatus 10, the oil or other contaminant layer 106 might be accumulated on the sensor, for example, by locating the sensor 16 proximate to a workpiece 100 during a manufacturing operation.) The application of the oil by the air brush in this experiment is at a slow enough rate to monitor the response of the QCM sensor in real time, measuring the resonance frequency, fs, with a frequency counter; measuring the damping voltage with a multimeter; and measuring the temperature of the cleaning medium with a thermocouple and readout; and recording these measurements at a variable sampling rate of about once per second or less on a computer having an IEEE-488 data acquisition board and a data acquisition program. (In industrial use, the cleaning monitor 14 might be used to similarly measure an accumulation of the contaminant on the sensor 16 to determine a necessity for cleaning of a workpiece 100, or for estimating a thickness of a contaminant on the workpiece and sensor.)

FIG. 7a shows a calculated frequency shift, Δf, obtained from the measurement of the variation in the resonant frequency, fs, of the QCM sensor; and FIG. 7b shows the damping voltage proportional to $R_2$ of the sensor. Five different response regions are shown in FIGS. 7a and 7b, separated by vertical dashed lines. In Region I of FIGS. 7a and 7b, the oil contaminant layer for this experiment is applied in air (i.e. with the cleaning sensor outside of the cleaning zone) to provide a total change in the damping voltage of about 0.5 volts as shown in FIG. 7b; and this produces a frequency shift, Δf, of about 2350 Hertz (as indicated by the widely-spaced horizontal dotted lines and the vertical line with arrows labelled "A" in FIG. 7a).

After application of the oil contamination layer 106 to the exposed side of the QCM sensor, there is only a small variation in the electrical response characteristics in FIGS. 7a and 7b during the time period from about 200 to 400 seconds. This variation may either be due to a rehydration of the vacuum oil contaminant layer 106 after the spray application with a dry nitrogen gas propellant stream; or else a slow redistribution of the oil layer on the exposed surface 38 of the QCM sensor 16. The mass change per unit area, Δm, due to loading of the QCM sensor with the oil film contaminant layer may be calculated from the frequency shift, Δf, using the Sauerbrey relationship as:

$$\Delta m = -\frac{\Delta f}{C_f}$$

where $C_f$=56.6 Hz-µg$^{-1}$-cm$^2$. From the frequency shift in FIG. 7a, the mass change per unit area is about 42 µg-cm$^{-2}$.

At room temperature, the Sauerbrey relationship holds for a thickness of this particular vacuum oil of up to about 1.2 microns, corresponding to a frequency shift, Δf, of up to about −6500 Hz. Thus, for the vacuum oil used, any frequency shift of less than about −6500 Hz may be directly and linearly related to the mass change per unit area, Δm, according to the above equation, allowing the mass and thickness of the oil contaminant layer to be accurately calculated (from the active area of the QCM sensor and the density of the oil, respectively).

After a time duration of 400 seconds, the response characteristics of the cleaning sensor during the experiment are substantially constant, and the sensor is then inserted into an aqueous solution of 10% by volume of a concentrated industrial cleaning medium (INPRO-CLEAN 1900 cleaner manufactured by Oakite Corporation, Berkeley Heights, N.J.) in water for precision cleaning to remove the vacuum oil contaminant layer as may be done during precision cleaning of a workpiece 100 having a substantially equal oil contaminant accumulation 102 in the apparatus 10 of the present invention.

In Region II of FIGS. 7a and 7b, the cleaning sensor 16 is immersed into the liquid cleaning medium 104 in the cleaning zone of the container 12 of the precision cleaning apparatus 10 for removal of the oil film contamination layer 106. As the cleaning sensor 16 is immersed into the liquid cleaning medium, an abrupt increase in the damping voltage in FIG. 7b occurs due to the additional loading of the QCM sensor 16 by the liquid cleaning medium. However, immediately afterwards the damping voltage and the frequency shift in Region II of FIG. 7 both rapidly decrease as the oil film contaminant layer is removed by contact with the cleaning medium. After less than a minute, the damping voltage and frequency shift change only slightly with time as the contaminant layer is substantially removed from the exposed surface 38 of the QCM sensor 16.

An expanded view of Region II in FIG. 7b is shown in FIG. 8 along with an exponential fit to the data using a functional relationship:

$$f(t) = f_0 \exp\left(\frac{t - t_0}{\tau}\right)$$

to calculate a time constant, τ, for characterizing the kinetics of the cleaning process. From the fitted data of FIG. 8, the time constant is τ=6.5 seconds for this particular cleaning process. The use of the damping voltage for a calculation of the time constant, τ, for cleaning may be preferred over the use of the frequency shift, Δf, since the frequency shift may be more sensitive to temperature changes as may occur when the QCM sensor 16 is immersed into the cleaning medium.

The measurement of Region II in FIG. 7 demonstrates the use of the precision cleaning apparatus 10 of the present invention for in-situ monitoring of a cleaning process. A workpiece inserted into the cleaning zone along with the QCM sensor and having an accumulation of contaminants thereon substantially equal to that of the layer on the exposed side of the cleaning sensor may be expected to be cleaned at substantially the same rate as measured by the cleaning monitor 14. A measurement as described above may further provide a method for determining the effectiveness of a cleaning medium for removing one or more contaminants from a workpiece, or for quantitatively comparing the effectiveness of different cleaning media for removing a contamination layer.

In Region III of FIG. 7, the QCM sensor 16 is removed from the cleaning zone and further cleaned by multiple jet sprays of the concentrated cleaning medium on the exposed side 38 of the cleaning sensor, separated by water rinses and air drying. This was done for removal of any residual contamination layer from the exposed side of the QCM sensor; and it results in the undulations in the electrical response characteristics in Region III of FIG. 7. A final air drying at the end of Region III verifies that the contaminant layer has been completely removed from the cleaning sensor, and the electrical response characteristics have been restored to their initial starting values.

After cleaning the exposed side of the QCM sensor in this manner, the cleaning sensor is again immersed into the liquid cleaning medium 104 to determine the electrical response characteristics corresponding to a "clean" state of the sensor 16. The response of the QCM sensor 16 in the "clean" state of Region IV in FIG. 7 is due solely to the cleaning medium and may be related to the density-viscosity product of the cleaning medium as described heretofore in the equation for the impedance contribution, $Z_L$. This measurement or calibration of a "clean" state of the sensor may be performed prior to the accumulation of the contaminant layer 106 on the cleaning sensor 16; and may further provide a means for evaluating changes in the cleaning medium with time such as may occur, for example, due to dissolved contaminants or the like.

The difference in one or more electrical response characteristics between the "clean" state of Region IV and the termination of the cleaning process in Region II may be used for determining a residual accumulation of the contaminant after cleaning for a time interval. This is shown, for example, for the frequency shift measurement of FIG. 7a, with the difference in frequency shift, $\Delta f$, between the end of Region II and Region IV being indicated by the closely-spaced pair of dotted horizontal lines and the vertical arrows labelled "B". This residual contamination layer results in a frequency shift of about 125 Hz, corresponding to a calculated residual vacuum oil layer thickness of about 0.025 µm, or a mass change per unit area, $\Delta m$, of about 2.2 µg-cm$^{-2}$ at the termination of cleaning in Region II. Thus, the precision cleaning apparatus 10 shows that for the particular cleaning medium used for removal of a vacuum oil contamination layer in these measurements the cleaning was rapid, but not altogether thorough and complete. For cleaning of a workpiece 100, this measurement of a residual contamination layer on the cleaning sensor 16 provides a measure of an unremoved portion of the contaminant accumulation 102 on the workpiece. As shown hereinafter, such a measurement of any residual accumulation of the contaminant after cleaning may also provide a method for determining an effectiveness of a cleaning medium for removing one or more contaminants from a workpiece, or for comparing the effectiveness of a plurality of cleaning media for removing contaminants from the workpiece.

In Region V of FIG. 7, the QCM sensor 16 is removed from the cleaning medium, rinsed with deionized water, and dried with a stream of a dry gas such as $N_2$. The measurement of the electrical response characteristics in Region V serves to verify the accuracy of the cleaning measurements, and may serve to establish or verify a calibration of the cleaning monitor 14.

Cleaning processes according to the present invention may contain one or more of the measurement regions similar to the Regions I to V as illustrated by the example of FIG. 7, with modifications thereof as may be learned by practice of the present invention. For example, although the contaminant layer was applied manually in Region I of FIG. 7 for the experiment described herein, the contaminant layer may be accumulated on an exposed surface of a cleaning sensor 16 by locating the sensor proximate to a workpiece 100 (for example, attached to the workpiece or a workpiece carrier) during a manufacturing operation whereby one or more contaminants are accumulated on a surface of the workpiece. In this way, a contaminant layer 106 may be provided that is substantially equal to the accumulation 102 on the workpiece. Other modifications may be made for practice of the present invention with other types of cleaning sensors 16 as described heretofore.

Table 1 shows the results of room-temperature (23° C.) cleaning of a vacuum oil contaminant layer using the precision cleaning apparatus of the present invention with a QCM sensor 16. For these measurements, the results for various concentrations (i.e. percent by volume of a concentrated cleaner in water) of an INPRO-CLEAN 1900 cleaning medium, or a MICRO cleaning medium, or a deionized water cleaning medium are compared. The residual oil layer after cleaning as shown in the third column of Tables 1 and 2 represents the amount $\Delta m$ of residual accumulation of oil remaining on the cleaning sensor after cleaning for a time period sufficient for reaching a steady-state condition whereby the electrical response characteristics are substantially constant, unchanging with time. The residual accumulation of the oil contaminant layer is also expressed as a percentage of the initial oil layer applied to the cleaning sensor 16 to compare the effectiveness of the various cleaning media (including water) for removing the contamination from the sensor, and to compensate for the variations in the initial application of the oil contaminant layer in Column 2.

In Table 1, the percentage of the initial oil layer remaining after cleaning is reduced as the concentration of the cleaning medium is increased. Table 1 further shows that although the MICRO cleaner operates at a slower rate (i.e. a larger time constant, $\tau$, for cleaning), the MICRO cleaning medium is more effective than the INPRO-CLEAN 1900 medium for removing the vacuum oil contamination layer from the sensor.

Table 2 shows similar cleaning measurements performed at an elevated temperature of about 50° C. A comparison of the results in Tables 1 and 2 shows that the elevated-temperature cleaning media result in a smaller percentage of the initial oil contamination

TABLE 1

Room-Temperature Cleaning of an Oil Contaminant Layer

| Cleaning Medium | $\Delta m$ of Oil Layer Initially Applied (µm-cm$^{-2}$) | $\Delta m$ of Residual Oil Layer After Cleaning (µm-cm$^{-2}$) | % of Initial Oil Layer Remaining After Cleaning | Time Constant, $\tau$, for Cleaning (s) |
|---|---|---|---|---|
| Deionized Water | 64.1 | 8.8 | 14 | 42 |
| 2% MICRO in Water | 64 | 0.9 | 1.6 | 29 |
| 10% MICRO in Water | 75.5 | 1.0 | 1.1 | 16 |
| 20% MICRO in Water | 75.1 | 0 | 0 | 12 |
| 10% INPRO-CLEAN 1900 in Water | 41.7 | 2.2 | 5.3 | 6.5 |
| 20% INPRO-CLEAN 1900 in Water | 52.4 | 1.5 | 2.9 | 6.1 | layer remaining after cleaning as compared with the same cleaning media at room-temperature.

The time constant, $\tau$, for cleaning also provides important information about kinetics of the cleaning process and provides at least in part a measure for determining the effectiveness of a cleaning medium for removing one or more contamination layers from a workpiece. For example, the time constant, $\tau$, is much faster for the INPRO-CLEAN 1900 cleaning medium than for the MICRO cleaning medium indicating that the INPRO-CLEAN 1900 cleaning medium is more effective for removing a vacuum oil contaminant from a workpiece. This is also evidenced by the smaller percentage of the initial oil layer remaining after cleaning with the INPRO-CLEAN 1900 cleaning medium.

The time constant, $\tau$, may also provide a method for evaluating different concentrations of the same cleaning medium, or for determining a useful service life for the

TABLE 2

Elevated-Temperature 50° C.) Cleaning of an Oil Contaminat Layer

| Cleaning Medium | Δm of Oil Layer Initially Applied (μm-cm$^{-2}$) | Δm of Residual Oil Layer After Cleaning (μm-cm$^{-2}$) | % of Initial Oil Layer Remaining After Cleaning | Time Constant, τ, for Cleaning (s) |
|---|---|---|---|---|
| Deionized Water | 59.0 | 7.0 | 12 | 4.9 |
| 2% MICRO in Water | 34.3 | 2.0 | 5.7 | 3.9 |
| 10% MICRO in Water | 50.4 | 1.3 | 2.7 | 4.5 |
| 20% MICRO in Water | 45.8 | 0 | 0 | 7.0 |
| 10% INPRO-CLEAN 1900 in Water | 58.3 | 0 | 0 | 1.4 |
| 20% INPRO-CLEAN 1900 in Water | 56.1 | 0 | 0 | 0.7 | cleaning medium. For example, an increased concentration of INPRO-CLEAN 1900 in water at 50° C. results in a faster cleaning rate as evidenced by the reduced value of the time constant, τ. However, this is not the case for the MICRO cleaning medium at 50° C. for which the time constant, τ, increases with concentration; whereas at room temperature, the time constant for the MICRO cleaning medium decreased with concentration. This behavior may indicate that the cleaning process for the MICRO cleaning medium varies with temperature, with a higher concentration cleaning medium cleaning more slowly but more completely than a lower concentration medium.

Experiments to date with the precision cleaning apparatus 10 of the present invention show a low noise level of about 1 Hz, allowing a mass change per unit area, Δm, of as small as about 20 ng-cm$^{-2}$ to be measured in real time. This high sensitivity allows the removal of a contaminant layer or accumulation to be measured in real time as shown heretofore. For calibrating the sensor 16 of the cleaning monitor 14, the cleaning sensor may be removed from the cleaning zone and dried to eliminate any loading of the sensor due to the cleaning medium. When this is done, the frequency shift is measurable with a reproducibility of about 0.6 Hz, corresponding to a mass change per unit area, Δm, of about 10 ng-cm$^{-2}$, indicating that a residual contamination layer thickness as small as about one monolayer may be measurable with the precision cleaning apparatus 10 of the present invention.

A preferred method for using the cleaning monitor 14 according to the present invention is to use the cleaning sensor to measure in-situ the removal of an accumulation or layer of one or more contaminants on the cleaning sensor 16 and a workpiece 100 in real-time during a cleaning process; and after one or more electrical response characteristics indicates that the contaminant has been substantially removed, to dry the cleaning sensor and measure any residual contamination on the sensor (and hence on the workpiece). Other cleaning methods or procedures will become evident to those skilled in the art from practice of the present invention.

The present invention provides a method for evaluating the removal of any number of contaminants from a workpiece 100 and cleaning sensor 16 by one or more cleaning media 104. The present invention also allows the minimum concentration of a cleaning medium to be determined for effectively cleaning a workpiece and sensor; and provides a quantitative measure of the kinetics of the cleaning process. In this manner, the concentration or amount of a cleaning medium may be optimized for minimizing waste and reducing the cost for cleaning. Furthermore, the cleaning monitor according to the present invention may be used to verify the integrity of a cleaning bath (i.e. a cleaning zone), minimizing a risk for decreased cleaning effectiveness and allowing the cleaning bath to be used for a longer period of time before replacement of the cleaning medium (again, minimizing waste and reducing cost).

The matter set forth in the foregoing description and accompanying drawings is offered by way of illustration only and not as a limitation. Other applications and variations of the precision cleaning apparatus and method will become evident to those skilled in the art. The actual scope of the invention is intended to be defined in the following claims when viewed in their proper perspective based on the prior art.

What is claimed is:

1. Apparatus for precision cleaning of an accumulation of at least one contaminant from a surface of a workpiece during contact with a cleaning medium, the apparatus comprising:

(a) a cleaning container having walls which define a cleaning zone wherein the workpiece is contacted by the cleaning medium for removal of the contaminant therefrom; and (b) a cleaning monitor comprising a sensor insertable into the cleaning zone with at least one exposed side thereof for accumulating prior to insertion of the sensor into the cleaning zone a layer of the contaminant thereon substantially equal to the accumulation on the workpiece, and measurement means connectable to the sensor for measuring at least one electrical response characteristic thereof that varies in response to removal of the layer of contaminant therefrom by contact with the cleaning medium.

2. The apparatus for precision cleaning of claim 1 in which the sensor is selected from the group of acoustic wave sensors consisting of quartz crystal microbalances, flexural plate wave sensors, acoustic plate mode sensors, and surface acoustic wave sensors.

3. The apparatus for precision cleaning of claim 2 in which the measurement means includes an oscillator circuit for activating the sensor and providing the at least one electrical response.

4. The apparatus for precision cleaning of claim 3 in which the electrical response characteristic is selected from the group consisting of a resonant frequency, a frequency shift, a damping voltage, a damping resistance, or a combination thereof.

5. The apparatus for precision cleaning of claim 3 in which the oscillator circuit is located proximate to the sensor within a housing having an opening for the exposed side of the sensor and a liquid-tight barrier between the oscillator circuit and the sensor.

6. The apparatus for precision cleaning of claim 3 in which the electrical response characteristic provides an indication of a state of cleanliness of the workpiece.

7. The apparatus for precision cleaning of claim 1 further including a heater and a temperature controller for maintaining the cleaning medium at an elevated temperature.

8. The apparatus for precision cleaning of claim 1 further including an ultrasonic agitator.

9. The apparatus for precision cleaning of claim 1 in which the sensor is attachable to the workpiece.

10. The apparatus for precision cleaning of claim 1 in which the sensor is attachable to a workpiece carrier.

11. The apparatus for precision cleaning of claim 1 in which the contaminant is an organic material.

12. The apparatus for precision cleaning of claim 11 in which the organic material comprises at least in part an oil.

13. The apparatus for precision cleaning of claim 1 in which the cleaning medium is an aqueous solution including a cleaning agent.

14. The apparatus for precision cleaning of claim 1 in which the cleaning medium is an organic solvent.

15. The apparatus for precision cleaning of claim 1 including at least one indicator for indicating a state of cleanliness of the workpiece.

16. The apparatus for precision cleaning of claim 15 in which the indicator provides a quantitative measure for the state of cleanliness.

17. The apparatus for precision cleaning of claim 15 in which the indicator provides a visual signal for indicating the state of cleanliness.

18. The apparatus for precision cleaning of claim 15 in which the indicator provides an audible signal for indicating the state of cleanliness.

19. A cleaning monitor for determining an effectiveness of precision cleaning of an accumulation of at least one contaminant from a surface of a workpiece in contact with a cleaning medium within a cleaning zone comprising:

(a) a sensor insertable into the cleaning zone and having at least one exposed side thereof for accumulation prior to insertion of the sensor into the cleaning zone of a layer of the contaminant substantially equal to the accumulation on the workpiece; and (b) measurement means connectable to the sensor for measuring at least one electrical response characteristic thereof that varies in response to removal of the layer of contaminants from the exposed side of the sensor by contact with the cleaning medium.

20. The cleaning monitor of claim 19 in which the sensor is selected from the group of acoustic wave sensors consisting of quartz crystal microbalances, flexural plate wave sensors, acoustic plate mode sensors, and surface acoustic wave sensors.

21. The cleaning monitor of claim 20 in which the measurement means includes an oscillator circuit for activating the sensor and providing the at least one electrical response characteristic for measuring removal of the layer of contaminant from the sensor.

22. The cleaning monitor of claim 21 in which the oscillator circuit is located proximate to the sensor within a housing having an opening for the exposed side of the sensor and a liquid-tight barrier between the oscillator circuit and the sensor.

23. The cleaning monitor of claim 21 including at least one indicator for indicating a state of cleanliness of the workpiece.

24. The cleaning monitor of claim 23 in which the indicator provides a quantitative measure for the state of cleanliness.

25. The cleaning monitor of claim 23 in which the indicator provides a visual signal for indicating the state of cleanliness.

26. The cleaning monitor of claim 23 in which the indicator provides an audible signal for indicating the state of cleanliness.

27. Apparatus for precision cleaning of an accumulation of a contaminant from a surface of a workpiece during contact with a cleaning medium, the apparatus comprising:

(a) a cleaning container having walls which define a cleaning zone wherein the workpiece is contacted by the cleaning medium for removal of the contaminant therefrom; and (b) a cleaning monitor comprising an acoustic-wave sensor insertable into the cleaning zone with at least one exposed side thereof for accumulating prior to insertion of the sensor into the cleaning zone a layer of the contaminant thereon substantially equal to the accumulation on the workpiece, and measurement means connectable to the sensor for measuring at least one electrical response characteristic thereof that varies in response to removal of the layer of contaminant therefrom by contact with the cleaning medium.

28. The apparatus of claim 27 in which the acoustic-wave sensor is selected from the group consisting of quartz crystal microbalances, flexural plate wave sensors, acoustic plate mode sensors, and surface acoustic wave sensors.

29. The apparatus of claim 27 in which the acoustic-wave sensor provides an indication of a state of cleanliness of the workpiece.

30. The apparatus of claim 29 further including means for agitating the cleaning medium.

31. Apparatus for precision cleaning of a contaminant from a workpiece comprising:

(a) means for contacting the workpiece with a cleaning medium; and (b) means for measuring removal of an accumulated layer of the contaminant from a sensor to provide an indication of removal of the contaminant from the workpiece.

32. The apparatus of claim 31 in which the measuring means includes an acoustic-wave sensor selected from the group consisting of quartz crystal microbalances, flexural plate wave sensors, acoustic plate mode sensors, and surface acoustic wave sensors.

33. The apparatus of claim 31 wherein the measuring means further includes means for indicating a state of cleanliness of the workpiece.

34. Apparatus for precision cleaning of a contaminant from a workpiece comprising:

(a) a container having a cleaning zone wherein the workpiece is in contact with a cleaning medium; and (b) a sensor located in the cleaning zone and in contact with the cleaning medium, the sensor being responsive to removal of a layer of the contaminant accumulated thereon to sense removal of the contaminant from the workpiece.

35. The apparatus of claim 34 in which the sensor is an acoustic-wave sensor selected from the group consisting of quartz crystal microbalances, flexural plate wave sensors, acoustic plate mode sensors, and surface acoustic wave sensors.

\* \* \* \* \*